UNITED STATES PATENT OFFICE.

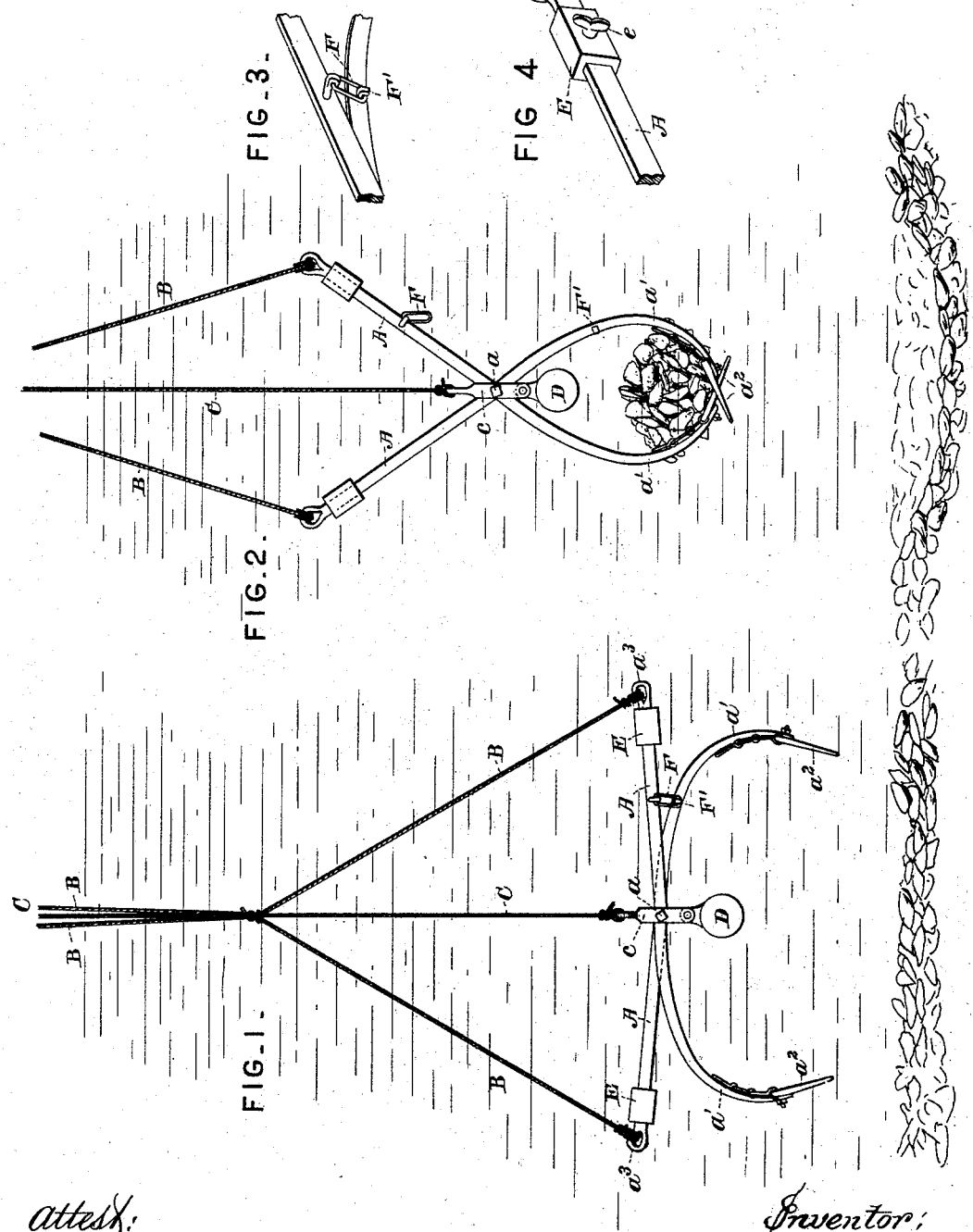

CHARLES L. MARSH, OF SOLOMON'S ISLAND, MARYLAND.

OYSTER-TONGS.

SPECIFICATION forming part of Letters Patent No. 374,195, dated December 6, 1887.

Application filed October 7, 1887. Serial No. 251,785. (No model.)

*To all whom it may concern:*

Be it known that I, CHARLES L. MARSH, of Solomon's Island, county of Calvert, and State of Maryland, have invented a new and useful Improvement in Oyster-Tongs, of which the following is a full, clear, and exact description, reference being had to the accompanying drawings, making part of this specification.

My invention relates to tongs for catching oysters and similar bivalves; and the objects of my invention are to produce an oyster-tongs which shall be simple and durable in construction and efficient in operation, and in the use of which no pole or poles shall be employed.

To the above purposes my invention consists in the peculiar and novel form and arrangement of the arms of which the tongs is composed; also, in the provision of adjustable weights for automatically opening the tongs; furthermore, in the provision of a weight for insuring the proper action of the tongs in seizing the oysters and removing them from their beds; also, in the peculiar and novel arrangement of the operating-lines for the tongs, and, finally, in the provision of a peculiar and novel form of catch for holding the tongs in open position and automatically allowing the same to close when required, all as hereinafter described and claimed.

In order that my invention may be more fully understood, I will proceed to describe it with reference to the accompanying drawings, in which—

Figure 1 is a side elevation of my improved oyster-tongs in open position, showing the catch in operation. Fig. 2 is a similar view of the same in closed position. Figs. 3 and 4 are detail views showing, respectively, the form of the catch and of the weights.

In the said drawings, A A designate the arms of the tongs, which are connected together at $a$ by a suitable pivot, and which are crossed upon each other in X form, as shown in Figs. 1 and 2. The lower ends of these arms are curved inward or toward each other, as shown at $a'$, such curved portions being almost or quite semicircular in shape, and carrying at their lower ends the rakes $a^2$, which are of the usual or any preferred form, as desired. The upper ends of the arms A are each provided with a ring or loop, $a^3$, or other suitable attachment, for connecting the lower ends of two closing-cords, B, as shown in Figs. 1 and 2, while at the pivot $a$ of the arms is located a loop, $c$, which surrounds the pivot, and to which is connected the lower end of the central or opening cord, C.

D designates a weight, which may be either of the precise form shown or of any other form which is suitable to the purpose. This weight is attached to the loop C in any suitable manner, and serves, as hereinafter described, to sink the tongs and to assist them in opening when required.

E E designate two tubular weights, which surround the arms A above their pivot $a$, and which are adjustable longitudinally upon said arms. Each of these weights is provided with a set-screw, $e$, or other equivalent device for securing them in any desired position of adjustment upon the arms A.

The operation of the above-described device is as follows: The tongs are lowered by means of the center line, the weights E serving to automatically open the arms, and the tongs are allowed to rest upon the bottom or oyster-bed. The lines B are now drawn upon, so as to close the arms together and draw the rakes toward each other. By means of the weights D E the tongs may be readily raised only a short distance, and then lowered for another take of oysters till the tongs become filled. The center weight, D, also serves to impart an additional grasp to the tongs, so that the oysters are more firmly gripped. The center line is only used when the tongs are being raised a short distance and then lowered, as before described.

An important feature of my invention is the catch, which is shown enlarged in Fig. 3. This catch is composed of two parts—a swinging link, F, which is attached to one of the arms above its pivot, and a hook, F', which is formed upon or attached to the opposite arm below its pivot. Before the tongs are thrown overboard the arms A are opened and the link is engaged with the hook. As soon as the tongs strike the bottom the link is automatically tripped or jolted off of the hook, thus allowing the arms to close together. It will thus be seen that the tongs may be readily locked before being thrown overboard, instead of afterward, as has heretofore been the case.

This device is especially serviceable in deep water, the weights serving to sink the tongs to great depths, and the device is also valuable in not requiring any poles, thus permitting of its use in swift tides and high winds.

As a whole, the tongs are simple and durable in construction, and are easily and rapidly manipulated.

Having thus described my invention, what I claim as new therein, and desire to secure by Letters Patent, is—

1. In an oyster-tongs, the combination, with the pivoted arms, of adjustable weights located upon said arms above their pivots, substantially as and for the purpose described.

2. The combination, with the pivoted arms of an oyster-tongs, of a central weight attached to said arms at their pivotal point, substantially as set forth.

3. The combination, with the pivoted arms of the oyster-tongs, of ropes or lines connected to the upper ends of said arms, a central rope or line attached to the pivotal point of said arms, and the adjustable weights on said upper ends of the arms, substantially as and for the purpose described.

4. The combination, with the pivoted arms of the oyster-tongs, of a catch consisting of a pivoted link or loop on one of said arms and a pin or stud located on the other arm, whereby the arms are adapted to be locked in open position, for the purpose and substantially as described.

5. The arms of an oyster-tongs, having a common pivotal point and provided with the inwardly-curved lower ends, the rakes formed thereon and attached thereto, and the loop or hanger embracing said arms at their pivotal point, in combination with the suspending-line attached to said loop or hanger, the operating-lines attached to the upper ends of the pivoted arms, the central weight suspended beneath the pivotal point of said arms, the adjustable weights on said arms, and means, substantially as described, for locking the arms in fixed relation to each other, as and for the purpose set forth.

In testimony whereof I have hereunto set my hand this 18th day of August, A. D. 1887.

CHAS. L. MARSH.

Witnesses:
L. M. LYLE,
J. T. MARSH.